(12) United States Patent
Ohno

(10) Patent No.: US 7,014,366 B2
(45) Date of Patent: Mar. 21, 2006

(54) FLUID DYNAMIC BEARING AND MAGNETIC DISK APPARATUS

(75) Inventor: Hideaki Ohno, Sennan (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 236 days.

(21) Appl. No.: 10/727,733

(22) Filed: Dec. 4, 2003

(65) Prior Publication Data

US 2004/0179758 A1    Sep. 16, 2004

(30) Foreign Application Priority Data

Dec. 6, 2002    (JP) .............................. 2002-355158

(51) Int. Cl.
    *F16C 17/02*    (2006.01)

(52) U.S. Cl. .................... 384/114; 384/476; 384/107

(58) Field of Classification Search ................ 384/114, 384/476, 115, 119, 120, 107
See application file for complete search history.

(56) References Cited

U.S. PATENT DOCUMENTS 4,573,807 A * 3/1986 Asada et al. ................ 384/100

* cited by examiner

*Primary Examiner*—Lenard A. Footland
(74) *Attorney, Agent, or Firm*—Akin Gump Strauss Hauer & Feld, LLP

(57) ABSTRACT

In the present invention, in order to provide a fluid dynamic bearing, having heat resistance, wherein the electrical charging on a rotation portion is prevented and the torque loss caused by a lubricant is made lower, an ionic liquid or the like is added to the lubricant filled in the clearance between the opposed faces of a shaft and a sleeve unit as an electrical conductivity imparting agent.

10 Claims, 2 Drawing Sheets

FLUID DYNAMIC BEARING AND MAGNETIC DISK APPARATUS

BACKGROUND OF THE INVENTION

The present invention relates to a fluid dynamic bearing wherein a lubricant filled in the clearance between a shaft and a sleeve for rotatably supporting the shaft is used as a pressure generation liquid. The fluid dynamic bearing in accordance with the present invention is used, for example, for magnetic disk drive spindle motors in magnetic disk apparatuses, polygon-mirror rotation drive apparatuses in high-speed digital copiers, laser printers, and rotary magnetic head apparatuses in video tape recorders, etc. More particularly, the present invention relates to a fluid dynamic bearing having means for preventing the charging of static electricity in the rotation portion thereof during high-speed rotation, and a magnetic disk apparatus.

The fluid dynamic bearing comprises at least a shaft, a sleeve for rotatably supporting this shaft and a lubricant serving as a lubrication fluid filled in the clearance between the shaft and the sleeve. In the fluid dynamic bearing, dynamic pressure generation grooves for raising the pressure of the filled fluid during rotation are formed on at least one of the outer circumferential face of the shaft and the inner circumferential face of the sleeve. Since the lubricant is filled in the clearance at the rotation portion on which the dynamic pressure generation grooves are formed as described above, the dynamic pressure of the lubricant is raised by the pumping action of the dynamic pressure generation grooves during the rotation of the shaft or the sleeve, and the shaft is held in a noncontact state by the sleeve via the lubricant.

In the driving state of the fluid dynamic bearing, one of the shaft and the sleeve rotates at high speed in a state of not making contact with each other via the lubricant. As a result, the rotation portion is electrically charged owing to the flow of the lubricant. In addition, in the case when the fluid dynamic bearing configured as described above is used for a magnetic disk apparatus, magnetic disks cause friction with air owing to the rotation of the magnetic disks and is electrically charged. This amount of the charge becomes larger as the speed of the magnetic disks is higher. The magnetic disks are secured to the sleeve, and the sleeve is rotatably held on the shaft in a noncontact state via the nonconductive lubricant. Hence, the charge generated on the magnetic disks serving as the rotation portion has no outflow passage, whereby the charge builds up gradually on the rotation portion, such as the magnetic disks and the sleeve. The static electricity charged as described above is in danger of being discharged suddenly during the operation of the magnetic disk apparatus. In the case when this kind of undesirable discharge occurred suddenly, there was a danger of causing malfunctions, such as read errors or write errors, in the magnetic disk apparatus and of causing static damage to the magnetic disks or the like. Hence, the magnetic disk apparatus using the conventional fluid dynamic bearing was unstable in operation and had problems in reliability.

To solve these problems, in the conventional fluid dynamic bearing, an electrical conductivity imparting agent, such as conductive polymer, carbon black or alkyl sulfonate, was added to the lubricant so that the charge is released via the lubricant.

However, in the case when the electrical conductivity imparting agent was added to the lubricant as described above, the viscosity of the lubricant increased, thereby increasing torque loss during high-speed rotation and causing the degradation of the lubricant owing to heat generation due to the torque loss.

BRIEF SUMMARY OF THE INVENTION

The present invention is intended to solve the problems in the conventional fluid dynamic bearing and is intended to provide a fluid dynamic bearing and a magnetic disk apparatus, having heat resistance and high reliability, wherein the electrical charging on the rotation portion is prevented and the torque loss caused by the lubricant is made lower than that of the conventional fluid dynamic bearing.

In order to attain the above-mentioned objects, the fluid dynamic bearing in accordance with the present invention comprises:

a shaft, a sleeve unit having a hole into which the shaft is inserted;

dynamic pressure generation grooves formed on one of the opposed faces of the shaft and the sleeve unit, and a lubricant filled in the clearance between the opposed faces of the shaft and the sleeve unit, to which an ionic liquid is added as an electrical conductivity imparting agent. The fluid dynamic bearing in accordance with the present invention configured as described above can prevent the electrical charging on the rotation portion and can reduce the torque loss caused by the lubricant.

And, in the fluid dynamic bearing in accordance with the present invention, the ionic liquid may be an ordinary-temperature molten salt comprising a combination of an organic acid and an organic salt.

Still further, in the fluid dynamic bearing in accordance with the present invention, the ionic liquid may be 1-butyl-3-methylimidazolium-hexafluorophoshate or 1-butyl-3-methylimidazolium-tetrafluoroborate.

The fluid dynamic bearing in accordance with another aspect of the present invention comprises a shaft, a sleeve unit having a hole into which the shaft is inserted;

dynamic pressure generation grooves formed on one of the opposed faces of the shaft and the sleeve unit, and a lubricant filled in the clearance between the opposed faces of the shaft and the sleeve unt, to which linear alkyl sulfonate is added as an electrical conductivity imparting agent. The fluid dynamic bearing in accordance with the present invention configured as described above can prevent the electrical charging on the rotation portion and can reduce the torque loss caused by the lubricant.

The fluid dynamic bearing in accordance with another aspect of the present invention comprises a shaft, a sleeve unit having a hole into which the shaft is inserted;

dynamic pressure generation grooves formed on one of the opposed faces of the shaft and the sleeve unit, and a lubricant filled in the clearance between the opposed faces of the shaft and the sleeve unit, to which a charge transfer complex is added as an electrical conductivity imparting agent. The fluid dynamic bearing in accordance with the present invention configured as described above can prevent the electrical charging on the rotation portion and can reduce the torque loss caused by the lubricant.

And, in the fluid dynamic bearing in accordance with the present invention, the charge transfer complex serving as an electrical conductivity imparting agent may be 2.4,7-trinitrofluorenone.polyvinylcarbazole or tetrathiaful (TCNQ).

The fluid dynamic bearing in accordance with another aspect of the present invention comprises a shaft, a sleeve unit having a hole into which the shaft is inserted;

dynamic pressure generation grooves formed on one of the opposed faces of the shaft and the sleeve unit, and a lubricant filled in the clearance between the opposed faces of the shaft and the sleeve unit, to which a mixture of an ionic polyvalent metal salt and a metal salt having a cation different from that of the ionic polyvalent metal salt is added as an electrical conductivity imparting agent. The fluid dynamic bearing in accordance with the present invention configured as described above can prevent the electrical charging on the rotation portion and can reduce the torque loss caused by the lubricant.

And, in the fluid dynamic bearing in accordance with the present invention, a combination of chromium triisopropyl salicylate and calcium di-2-ethylhexyl succinate, a combination of aluminum diisopropyl salicylate and magnesium oleate or a combination of copper palmitate and calcium diisopropyl salicylate may be used as an electrical conductivity imparting agent.

Still further, in the fluid dynamic bearing in accordance with the present invention, the dynamic pressure generation grooves formed on the opposed faces of the shaft and the sleeve unit can comprise one of or both radial dynamic pressure grooves for generating the dynamic pressure of the lubricant for holding the shaft in the radial direction and thrust dynamic pressure grooves for generating the dynamic pressure of the lubricant for holding the shaft in the thrust direction.

The magnetic disk apparatus in accordance with the present invention comprises the fluid dynamic bearing in accordance with the above-mentioned present invention, a hub to which magnetic recording media are secured, and a motor, comprising a stator coil and a rotor magnet, for rotating the shaft or the sleeve unit. The fluid dynamic bearing in accordance with the present invention configured as described above can prevent the electrical charging on the rotation portion and can reduce the torque loss caused by the lubricant; in addition, a fluid dynamic bearing having heat resistance and high reliability can be provided.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Preferred embodiments of a fluid dynamic bearing and a magnetic disk apparatus in accordance with the present invention will be described below referring to the accompanying drawings.

Embodiment 1

Figure 1:
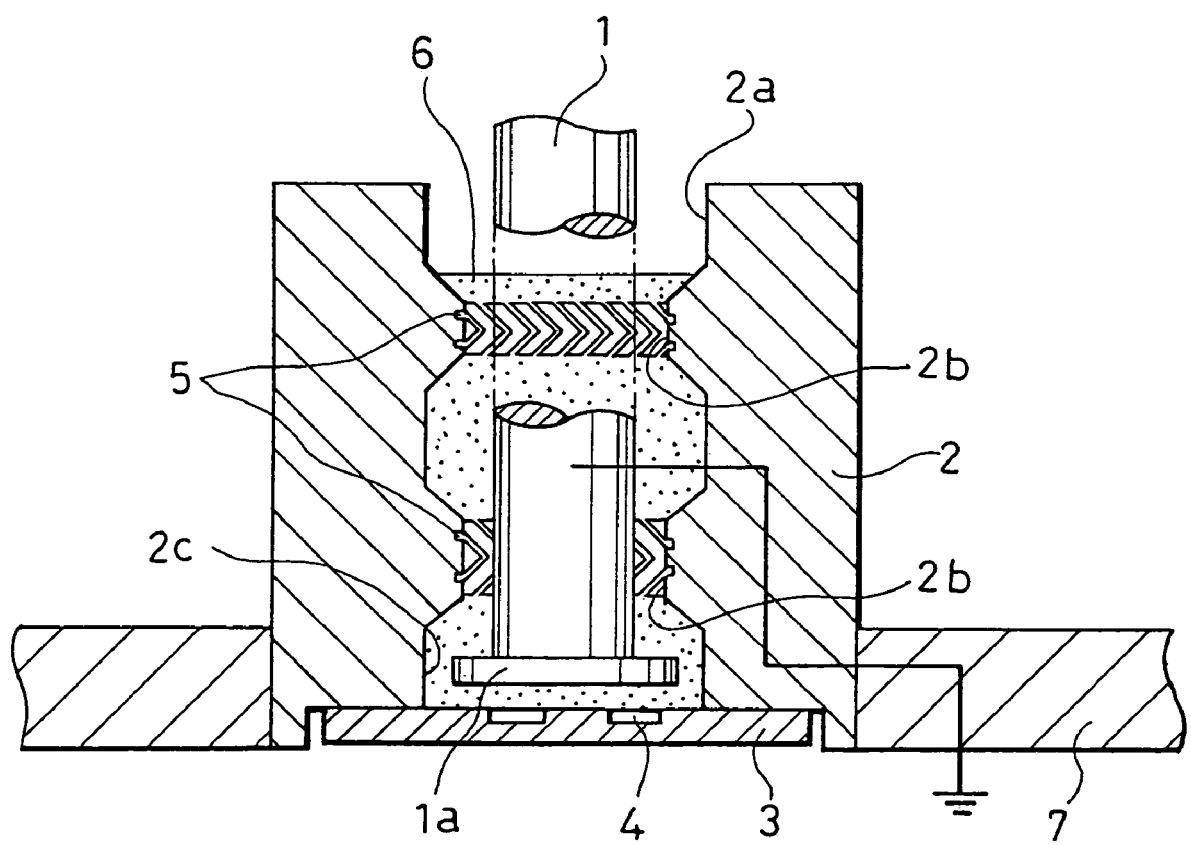
FIG. 1 is a cross-sectional view showing preferred embodiments of a fluid dynamic bearing in accordance with the present invention.

FIG. 1 is a cross-sectional view showing a fluid dynamic bearing in accordance with Embodiment 1 wherein a fluid dynamic bearing in accordance with the present invention is used for a hard disk drive (HDD) serving as one kind of a magnetic disk apparatus.

As shown in FIG. 1, the fluid dynamic bearing in accordance with Embodiment 1 comprises a shaft 1 configured so as to be rotatable, a sleeve 2, having a through hole 2a, for supporting this shaft 1 in the radial direction, a thrust plate 3 disposed so as to be opposed to the end face (the lower face in FIG. 1) of a flange portion 1a formed on one end of the shaft 1, and a lubricant 6. The lubricant 6 is filled in the clearance between the outer circumferential face of the shaft 1 and the inner face of the through hole 2a of the sleeve 2 and in the clearance between the flange portion 1a and the thrust plate 3. The sleeve 2 is formed so as to be integrated with a base 7 substantially secured to the housing of the hard disk drive (HDD). The thrust plate 3 is installed on the sleeve 2, whereby a sleeve unit is configured.

As shown in FIG. 1, radial dynamic pressure grooves 5 serving as herringbone-shaped grooves are formed on the inner face of the through hole 2a of the sleeve 2 at upper and lower two portions. Since the radial dynamic pressure grooves 5 are formed as described above, dynamic pressure is generated in the lubricant 6 by the pumping action for the lubricant 6 at the radial dynamic pressure grooves 5 during the rotation of the shaft 1. Hence, the shaft 1 is rotatably held without making contact with the sleeve 2 in the radial direction. In addition, thrust dynamic pressure grooves 4 serving as spiral grooves are formed on the face of the thrust plate 3 opposed to the flange portion 1a. Since the thrust dynamic pressure grooves 4 are formed as described above, dynamic pressure is generated in the lubricant 6 by the pumping action for the lubricant 6 at the thrust dynamic pressure grooves 4 during the rotation of the shaft 1. By this dynamic pressure, the shaft 1 is floated and rotatably supported via the lubricant 6 without making contact with the thrust plate 3 in the thrust direction.

As shown in FIG. 1, holding portions 2b having a smaller diameter and a flange receiving portion 2c having a larger diameter are formed in the through hole 2a of the sleeve 2. The above-mentioned radial dynamic pressure grooves 5 are formed on the holding portions 2b, and the shaft 1 is configured so as to be held securely by the holding portions 2b. The thrust plate 3 is installed on the sleeve 2 so as to close the flange receiving portion 2c. The flange portion 1a of the shaft 1 is disposed in the space formed by the flange receiving portion 2c and the thrust plate 3. The flange portion 1a formed on the shaft 1 is disposed inside the flange receiving portion 2c so as to prevent extraction. The flange portion 1a opposed to the thrust plate 3 is subjected to the dynamic pressure of the lubricant generated by the thrust dynamic pressure grooves 4, and the shaft 1 is floated and supported by a desired pressure without making contact with the sleeve 2.

In the fluid dynamic bearing in accordance with Embodiment 1, the lubricant 6 is filled in the clearances between the herringbone-shaped radial dynamic pressure grooves 5 formed on the inner circumferential faces of the holding portions 2b of the sleeve 2 and the shaft 1, and between the spiral thrust dynamic pressure grooves 4 formed on the inner face of the thrust plate 3 opposed to the flange portion 1a of the shaft 1 and the shaft 1.

In the fluid dynamic bearing in accordance with Embodiment 1 configured as described above, the shaft 1 is rotated around its axial center while the base 7 is fixed. As the shaft 1 is rotated, a pumping action is performed at the radial dynamic pressure grooves 5 on the basis of the herringbone shape thereof, and the pressure of the lubricant 6 rises at the central portion of the herringbone shape. As a result, the shaft 1 is pressed by the lubricant 6 and held at a desired position with respect to the sleeve 2 in a state of not making contact therewith.

In addition, as the shaft 1 is rotated, a pumping action at the spiral shape portions of the thrust dynamic pressure grooves 4 is performed, and the pressure of the lubricant 6 rises at the central portion thereof. As a result, the shaft 1 is floated from the thrust plate 3 by the lubricant 6, and the shaft 1 is in a state of not making contact with the thrust plate 3.

As described above, as the shaft 1 is rotated, the pressure of the lubricant 6 in the radial dynamic pressure grooves 5 rises, and the shaft 1 is held securely in the radial direction; in addition, the pressure of the lubricant 6 in the thrust dynamic pressure grooves 4 rises, and the shaft 1 is held securely in the thrust direction.

The lubricant 6 in the fluid dynamic bearing in accordance with Embodiment 1 of the present invention will be described below.

In the fluid dynamic bearing in accordance with Embodiment 1, an ionic liquid serving as an ordinary-temperature molten salt comprising a combination of an organic acid and an organic salt is added to the lubricant 6 to be filled in the clearance formed between the outer circumferential face of the shaft 1 and the inner circumferential face of the through hole 2a of the sleeve 2. As the combination of an organic acid and an organic salt, 1-butyl-3-methylimidazolium-hexafluorophoshate, 1-butyl-3-methylimidazolium-tetrafluoroborate or the like is available. In this way, by the addition of the ionic liquid to the lubricant 6, the lubricant 6 has constant electrical conductivity at all times. Hence, even when the shaft 1 and the sleeve 2 do not make contact with each other, an electrically conductive passage, having desired viscosity, can be securely formed between the shaft 1 and the sleeve 2.

The base oil of the lubricant 6 in accordance with Embodiment 1 is not limited in particular, provided that it has the viscosity required for the generation of dynamic pressure in the bearing; it is a mineral oil or a synthetic oil. A lubricant, such as α-olefin, ester oil, silicone oil or fluorine-based oil, is available as a synthetic oil. The lubricant 6 in accordance with Embodiment 1 was produced by adding 2 wt % of the above-mentioned ionic liquid to the base oil. When the electrical resistance of the lubricant 6 produced as described above was measured, the electrical conductivity was increased significantly, and the viscosity was maintained at a desired value. The electrical resistivity of the lubricant 6 in accordance with Embodiment 1 was $10^7$ [Ω·cm]. Hence, the electrical conductivity is added to the lubricant 6, whereby an electrically conductive passage is securely formed between the shaft 1 and the sleeve 2. As a result, static electricity generated on magnetic disks or the like can be discharged via this electrically conductive passage. According to the experiments conducted by the inventors, the addition amount of the ionic liquid is desired to be in the range of 0.01% or more and 10% or less with respect to the weight of the whole lubricant 6. The viscosity of the lubricant 6 at this time was in the range of 5 cSt to 30 cSt at 40° C.

In addition, in the fluid dynamic bearing in accordance with Embodiment 1, an example wherein the radial dynamic pressure grooves 5 are formed on the inner circumferential face of the through hole 2a of the sleeve 2 is described; however, radial dynamic pressure grooves serving as herringbone-shaped grooves may be formed on the outer circumferential face of the shaft 1, or radial dynamic pressure grooves serving as herringbone-shaped grooves may be formed on both the inner circumferential face of the through hole 2a of the sleeve 2 and the outer circumferential face of the shaft 1.

Furthermore, in the fluid dynamic bearing in accordance with Embodiment 1, an example wherein the thrust dynamic pressure grooves 4 are formed on the face of the thrust plate 3 opposed to the flange portion 1a is described; however, the thrust dynamic pressure grooves 4 may be formed on the face of the flange portion 1a opposed to the thrust plate 3, or the thrust dynamic pressure grooves 4 may be formed on the mutually opposed faces of the thrust plate 3 and the flange portion 1a. Still further, the thrust dynamic pressure grooves 4 may be formed as herringbone-shaped grooves formed around the center of the rotation.

Still further, the thrust dynamic pressure grooves 4 and the radial dynamic pressure grooves 5 should only be formed so as to have shapes wherein the pressure of the lubricant 6 is raised at the clearance between the opposed faces of the stationary portion and the rotation portion. Various modifications are possible, for example, bent portions having a desired shape wherein the pressure of the lubricant 6 is raised by rotation, just like the above-mentioned herringbone shape, are formed, or the depth, width, groove-forming angle, etc. of the groove are changed.

Still further, in the fluid dynamic bearing in accordance with Embodiment 1, a configuration wherein the shaft 1 is a rotation portion and the sleeve 2 is a stationary portion is shown; however, a configuration wherein the sleeve 2 is rotated and the shaft 1 is stationary may be used.

Still further, by adding various additives, such as an antioxidant, an oiliness improver, an extreme pressure agent and a rust preventive agent, to the lubricant in accordance with Embodiment 1, the functions of the lubricant can be enhanced. For example, 2,6-di-tertiary-butyl-p-cresol or the like is available as an antioxidant; stearic acid or the like is available as an oiliness improver, di-n-butyl phosphate or the like is available as an extreme pressure agent, and Ba-sulfonate or the like is available as a rust preventive agent.

As described above, in the fluid dynamic bearing in accordance with Embodiment 1, in the case when it is used for a magnetic disk apparatus, for example, by using a lubricant having desired viscosity and electrical conductivity, a passage for discharging static electricity generated on magnetic disks or the like can be obtained securely, and the rotation portion can be driven stably at very low loss torque for a long time.

Embodiment 2

A case wherein a fluid dynamic bearing in accordance with Embodiment 2 of the present invention is used for a hard disk drive (HDD) serving as another magnetic disk apparatus will be described below referring to the accompanying FIG. 2.

Figure 2:
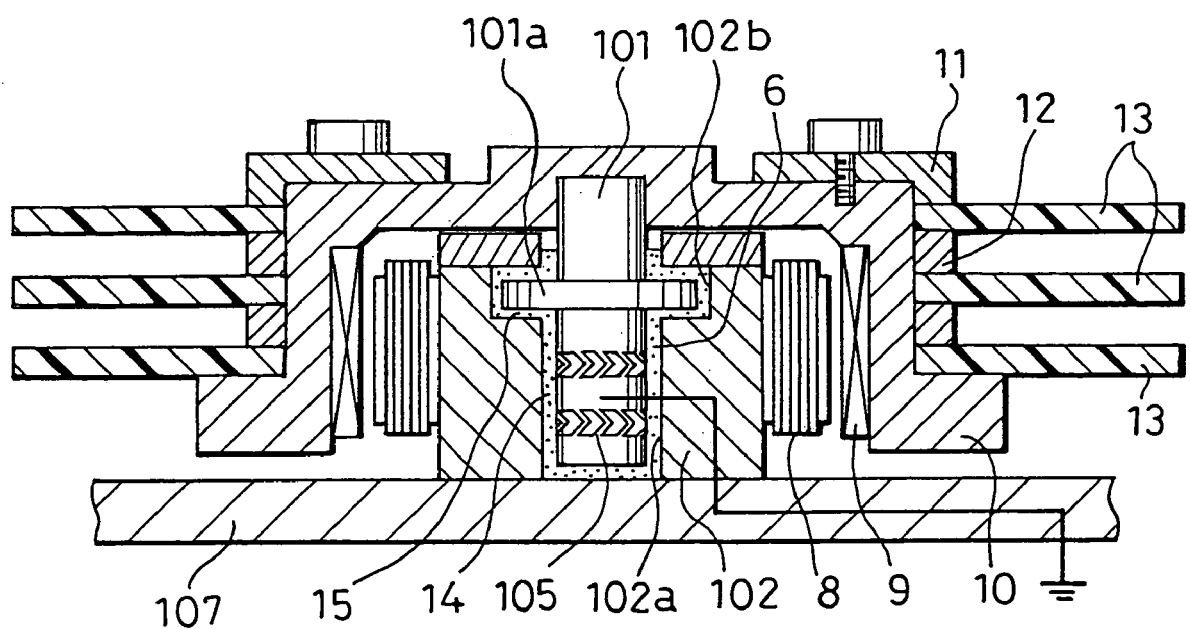
FIG. 2 is a cross-sectional view showing a configuration of a rotation portion of a magnetic disk apparatus using a fluid dynamic bearing in accordance with the present invention.

FIG. 2 is a cross-sectional view showing a case wherein the fluid dynamic bearing in accordance with Embodiment 2 of the present invention is used for a hard disk drive (HDD) serving as one of magnetic disk apparatuses.

As shown in FIG. 2, in the fluid dynamic bearing in accordance with Embodiment 2, three magnetic disks 13, 13 and 13 are stacked on a hub 10 and secured with a clamp 11. Spacers 12 are provided between the magnetic disks 13 so that the magnetic disks 13 are disposed at desired intervals. A rotor magnet 9 is provided on the inner circumferential face of the hub 10 having an inverted U-shaped cross-section. This rotor magnet 9 and a stator coil 8 provided on the outer circumferential face of a sleeve 102 serving as a stationary portion constitute a motor. The sleeve 102 is secured to a base 107 connected to earth. At the center of the sleeve 102, a hole 102a, into which the shaft 101 of the rotation portion is inserted, is formed. A part of the shaft 101 is press-fitted and secured at the center of the hub 10 to which the magnetic disks 13 are secured. A disk-shaped thrust receiver 101a is provided at a nearly intermediate portion of the shaft 1 in the axial direction thereof. This thrust receiver 101a is disposed in the large diameter portion 102b of the hole 102a of the sleeve 102.

In the fluid dynamic bearing in accordance with Embodiment 2 configured as described above, a lubricant 6 is filled in the clearance between the outer circumferential face of the shaft 101 and the inner circumferential face of the hole 102a of the sleeve 102, and the clearance between the outer face of the thrust receiver 101a and the inner face of the large diameter portion 102b. In other words, the lubricant 6 is filled in the radial clearance 14 between the shaft 101 and the sleeve 102, and in the thrust clearance 15 between the thrust receiver 101a and the large diameter portion 102b. This lubricant 6 is a lubricant having electrical conductivity, whereby an electrically conductive passage is formed between the shaft 101 and the sleeve 102 during rotation. In Embodiment 2, a sleeve unit is configured by using the sleeve 102.

The lubricant 6 in the fluid dynamic bearing in accordance with Embodiment 2 has the same composition as that of the lubricant in the above-mentioned Embodiment 1. In other words, an ionic liquid serving as an ordinary-temperature molten salt comprising a combination of an organic acid and an organic salt, represented by 1-butyl-3-methylimidazolium-hexafluorophoshate or 1-butyl-3-methylimidazolium-tetrafluoroborate or the like, is added to the base oil of the lubricant 6. The base oil of the lubricant 6 is not limited in particular, provided that it has the viscosity required for the generation of dynamic pressure in the bearing; it is a mineral oil or a synthetic oil; a lubricant, such as α-olefin, ester oil, silicone oil or fluorine-based oil, is used as a synthetic oil.

Furthermore, by adding various additives, such as an antioxidant, an oiliness improver, an extreme pressure agent and a rust preventive agent, to the lubricant in accordance with Embodiment 2, the functions of the lubricant may be enhanced.

As shown in FIG. 2, in the fluid dynamic bearing in accordance with Embodiment 2, radial dynamic pressure grooves 105 serving as herringbone-shaped grooves are formed on the outer circumferential face of the shaft 101 at upper and lower two portions. Since the radial dynamic pressure grooves 105 are formed as described above, a pumping action is performed for the lubricant at the radial dynamic pressure grooves 105 during the rotation of the shaft 101, whereby dynamic pressure is generated in the lubricant. Hence, the shaft 101 is rotatably held without making contact with the sleeve 102 in the radial direction. In addition, thrust dynamic pressure grooves serving as herringbone-shaped grooves are formed on the face, opposed to the lower face of the thrust receiver 101a, of the large diameter portion 102b in the hole 102a of the sleeve 102. Since the thrust dynamic pressure grooves are formed as described above, a pumping action is performed for the lubricant at the thrust dynamic pressure grooves during the rotation of the shaft 101, whereby dynamic pressure is generated in the lubricant. Hence, the shaft 101 is floated in the thrust direction and rotatably supported without making contact with the sleeve 102.

In the fluid dynamic bearing in accordance with Embodiment 2, the rotation portion comprising the magnetic disks 13, the hub 10, the shaft 101, etc. is rotated at high speed by starting the motor comprising the stator coil 8 and the rotor magnet 9. By the rotation of the rotation portion, the pumping action is performed to the lubricant 6 filled in the radial clearance 14 and the thrust clearance 15 at the radial dynamic pressure grooves 105 and the thrust dynamic pressure grooves, and dynamic pressure is generated. By this dynamic pressure of the lubricant 6, the shaft 101 is floated, held in a desired position inside the sleeve 102 and rotated.

In the fluid dynamic bearing in accordance with Embodiment 2, the spacers 12 disposed between the stacked magnetic disks 13 and the clamp 11 for securing the magnetic disks 13 to the hub 10 are made of a conductive material, such as a metal or a conductive resin. Hence, the magnetic disks 13 are in a state of electrically connected to the hub 10. The hub 10 is made of aluminum or an iron-based metallic material and is electrically equivalent to the shaft 101 press-fitted in the hub 10. Hence, the magnetic disks 13 and the sleeve 102 are configured so as to be electrically connected via the lubricant having electrical conductivity, whereby the static electricity generated on the magnetic disks 13 is discharged through the base 107.

Furthermore, in the fluid dynamic bearing for use in the magnetic disk apparatus, in the case of a configuration wherein the shaft belongs to the stationary portion and the sleeve belongs to the rotation portion, the static electricity generated on the magnetic disks secured to the rotation portion is securely discharged through the base via the lubricant and the shaft.

As described above, in the fluid dynamic bearing in accordance with Embodiment 2, in the case when it is used for a magnetic disk apparatus, for example, by using a lubricant having desired viscosity and electrical conductivity, a passage for discharging static electricity generated on magnetic disks or the like can be obtained securely, and the rotation portion can be driven stably at very low loss torque for a long time.

Embodiment 3

A case wherein a fluid dynamic bearing in accordance with Embodiment 3 of the present invention is used for the hard disk drive (HDD) shown in FIG. 1 will be described below. The fluid dynamic bearing in accordance with Embodiment 3 has the substantially same configuration as that of the fluid dynamic bearing in accordance with the above-mentioned Embodiment 1, except the configuration of the lubricant.

The base oil of the lubricant in accordance with Embodiment 3 is not limited in particular, provided that it has the viscosity required for the generation of dynamic pressure in the bearing; it is a mineral oil or a synthetic oil; a lubricant, such as α-olefin, ester oil, silicone oil or fluorine-based oil, is used as a synthetic oil. The same base oil as the base oil of the lubricant in accordance with Embodiment 1 was used as the base oil of the lubricant in accordance with Embodiment 3. In the Embodiment 3, linear alkyl sulfonate is added to this base oil. The lubricant in accordance with Embodiment 3 was produced by adding 3 wt % of linear alkyl sulfonate. When the electrical resistance of the lubricant in accordance with Embodiment 3 produced as described above was measured, the electrical conductivity was increased significantly, and the viscosity was maintained at a desired value. The electrical resistivity of the lubricant in accordance with Embodiment 3 was $10^9$ [Ω·cm]. Hence, the electrical conductivity is added to the lubricant in accordance with Embodiment 3, whereby an electrically conductive passage is securely formed between the shaft and the sleeve. As a result, in the hard disk drive (HDD) using the fluid dynamic bearing in accordance with Embodiment 3, static electricity generated on magnetic disks or the like can be discharged via this electrically conductive passage. According to the experiments conducted by the inventors, the addition amount of the ionic liquid is desired to be in the range of 0.01% or more and 10% or less with respect to the weight of the whole lubricant. The viscosity of the lubricant at this time was in the range of 5 cSt to 30 cSt at 40° C.

Since linear alkyl sulfonate is added to the lubricant in the fluid dynamic bearing in accordance with Embodiment 3 as described above, the increase of the viscosity is less than that in the case when alkyl allyl sulfonate of a similar kind is added. In addition, in the fluid dynamic bearing in accordance with Embodiment 3, constant electrical conductivity can be imparted to the lubricant at all times, whereby the electrically conductive passage between the rotation portion and the stationary portion can be obtained securely.

Furthermore, by adding various additives, such as an antioxidant, an oiliness improver, an extreme pressure agent and a rust preventive agent, to the lubricant in accordance with Embodiment 3, the functions of the lubricant may be enhanced.

Still further, in the fluid dynamic bearing in accordance with Embodiment 3, the case wherein the fluid dynamic bearing in accordance with Embodiment 3 is used for the hard disk drive (HDD) shown in FIG. 1 has been described; however, it can also be used for the magnetic disk apparatus shown in FIG. 2.

As described above, in the fluid dynamic bearing in accordance with Embodiment 3, in the case when it is used for a magnetic disk apparatus, for example, by using a lubricant having desired viscosity and electrical conductivity, a passage for discharging static electricity generated on magnetic disks or the like is obtained, and the rotation portion can be driven stably at very low loss torque for a long time.

Embodiment 4

A case wherein a fluid dynamic bearing in accordance with Embodiment 4 of the present invention is used for the hard disk drive (HDD) shown in FIG. 1 will be described below. The fluid dynamic bearing in accordance with Embodiment 4 has the substantially same configuration as that of the fluid dynamic bearing in accordance with the above-mentioned Embodiment 1, except the configuration of the lubricant.

The base oil of the lubricant in accordance with Embodiment 4 is not limited in particular, provided that it has the viscosity required for the generation of dynamic pressure in the bearing; it is a mineral oil or a synthetic oil; a lubricant, such as α-olefin, ester oil, silicone oil or fluorine-based oil, is used as a synthetic oil. The same base oil as the base oil of the lubricant in accordance with Embodiment 1 was used as the base oil of the lubricant in accordance with Embodiment 4. In the Embodiment 4, a charge transfer complex, such as 2.4,7-trinitrofluorenone.polyvinylcarbazole or tetrathiafulvalene (TTF).tetracyanoquinodimethane (TCNQ), is added to this base oil.

The lubricant in accordance with Embodiment 4 was produced by adding 2 wt % of the charge transfer complex. When the electrical resistance of the lubricant in accordance with Embodiment 4 produced as described above was measured, the electrical conductivity was increased significantly, and the viscosity was maintained at a desired value. The electrical resistivity of the lubricant in accordance with Embodiment 4 was $10^8$ [Ω·cm]. Hence, the electrical conductivity is added to the lubricant in accordance with Embodiment 4, whereby an electrically conductive passage is securely formed between the shaft and the sleeve. As a result, in the hard disk drive (HDD) using the fluid dynamic bearing in accordance with Embodiment 4, static electricity generated on magnetic disks or the like can be discharged via this electrically conductive passage. According to the experiments conducted by the inventors, the addition amount of the charge transfer complex is desired to be in the range of 0.01% or more and 10% or less with respect to the weight of the whole lubricant. The viscosity of the lubricant at this time was in the range of 5 cSt to 30 cSt at 40° C.

By adding the charge transfer complex, such as 2.4,7-trinitrofluorenone.polyvinylcarbazole or tetrathiafulvalene (TTF).tetracyanoquinodimethane (TCNQ), to the lubricant in the fluid dynamic bearing in accordance with Embodiment 4 as described above, constant electrical conductivity can be imparted to the lubricant at all times, whereby the electrically conductive passage between the rotation portion and the stationary portion can be obtained securely.

Furthermore, by adding various additives, such as an antioxidant, an oiliness improver, an extreme pressure agent and a rust preventive agent, to the lubricant in accordance with Embodiment 4, the functions of the lubricant can be enhanced.

Still further, in the fluid dynamic bearing in accordance with Embodiment 4, the case wherein the fluid dynamic bearing in accordance with Embodiment 4 is used for the hard disk drive (HDD) shown in FIG. 1 has been described; however, it can also be used for the magnetic disk apparatus shown in FIG. 2.

As described above, in the fluid dynamic bearing in accordance with Embodiment 4, in the case when it is used for a magnetic disk apparatus, for example, by using a lubricant having desired viscosity and electrical conductivity, a passage for discharging static electricity generated on magnetic disks or the like is obtained securely, and the rotation portion can be driven stably at very low loss torque for a long time.

Embodiment 5

A case wherein a fluid dynamic bearing in accordance with Embodiment 5 of the present invention is used for the hard disk drive (HDD) shown in FIG. 1 will be described below. The fluid dynamic bearing in accordance with Embodiment 5 has the substantially same configuration as that of the fluid dynamic bearing in accordance with the above-mentioned Embodiment 1, except the configuration of the lubricant.

The base oil of the lubricant in accordance with Embodiment 5 is not limited in particular, provided that it has the viscosity required for the generation of dynamic pressure in the bearing; it is a mineral oil or a synthetic oil; a lubricant, such as α-olefin, ester oil, silicone oil or fluorine-based oil, is used as a synthetic oil. The same base oil as the base oil of the lubricant in accordance with Embodiment 1 was used as the base oil of the lubricant in accordance with Embodiment 5. In the Embodiment 5, in a combination of a magnesium salt obtained by reaction with a carboxylic acid, a sulfonic acid or the like; an alkaline earth metal salt obtained by reaction with a carboxylic acid, a sulfonic acid or the like; a salt of a polyvalent metal, such as Cu, Fe, Mn, Ni, Co or Cr, obtained by reaction with a carboxylic acid, a sulfonic acid or the like, that is, carboxylate acid salt or sulfonate acid salt formed of an ionic polyvalent metal salt; and a mixture of a salt having a cation (positive ion), such as an alkylated ammonium salt, and a salt having a cation (positive ion) different from that of the above-mentioned ionic polyvalent metal salt, is added to the base oil.

As a specific example of the additive to the base oil of the lubricant in accordance with Embodiment 5, a combination of chromium triisopropyl salicylate and calcium di-2-ethylhexyl succinate, a combination of aluminum diisopropyl salicylate and magnesium oleate, a combination of copper palmitate and calcium diisopropyl salicylate or the like is used.

The lubricant in accordance with Embodiment 5 was produced by adding 2 wt % of the above-mentioned additive to the base oil. When the electrical resistance of the lubricant in accordance with Embodiment 5 produced as described above was measured, the electrical conductivity was increased significantly, and the viscosity was maintained at a desired value. The electrical resistivity of the lubricant in accordance with Embodiment 5 was 109 [Ω·cm]. Hence, the electrical conductivity is added to the lubricant in accordance with Embodiment 5, whereby an electrically conductive passage is securely formed between the shaft and the sleeve. As a result, in the hard disk drive (HDD) using the fluid dynamic bearing in accordance with Embodiment 5, static electricity generated on magnetic disks or the like can be discharged via this electrically conductive passage. According to the experiments conducted by the inventors, the addition amount of the above-mentioned additive is desired to be in the range of 0.01% or more and 10% or less with respect to the weight of the whole lubricant. The viscosity of the lubricant at this time was in the range of 5 cSt to 30 cSt at 40° C.

By mixing the above-mentioned additive with the lubricant in the fluid dynamic bearing in accordance with Embodiment 5 as described above, constant electrical conductivity can be imparted to the lubricant at all times, whereby the electrically conductive passage between the rotation portion and the stationary portion can be obtained securely.

Furthermore, by adding various additives, such as an antioxidant, an oiliness improver, an extreme pressure agent and a rust preventive agent, to the lubricant in accordance with Embodiment 5, the functions of the lubricant can be enhanced.

Still further, in the fluid dynamic bearing in accordance with Embodiment 5, the case wherein the fluid dynamic bearing in accordance with Embodiment 5 is used for the hard disk drive (HDD) shown in FIG. 1 has been described; however, it can also be used for the magnetic disk apparatus shown in FIG. 2.

As described above, in the fluid dynamic bearing in accordance with Embodiment 5, in the case wherein it is used for a magnetic disk apparatus, for example, by using a lubricant having desired viscosity and electrical conductivity, a passage for discharging static electricity generated on magnetic disks or the like is obtained and the rotation portion can be driven stably at very low loss torque for a long time.

Since the lubricant filled in the clearance between the shaft and the sleeve contains an electrical conductivity imparting agent as described above, static electricity does not build up at the rotation portion, whereby the fluid dynamic bearing and the magnetic disk apparatus using the fluid dynamic bearing in accordance with the present invention operate stably even in usage conditions, such as a high-speed rotation condition, and can securely attain a low torque loss.

Although the present invention has been described in detail to some extent in terms of the preferred embodiments, it is to be understood that such disclosure could have any change in the configurative details. Accordingly, various combinations of each element and the change of their order are to be achieved without departing from the scope and true spirit of the claimed invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A fluid dynamic bearing comprising:
   a shaft;
   a sleeve unit having a hole into which said shaft is inserted;
   dynamic pressure generation grooves formed on one of the opposed faces of said shaft and said sleeve unit; and
   a lubricant filled in the clearance between the opposed faces of said shaft and said sleeve unit, to which an ionic liquid is added as an electrical conductivity imparting agent.

2. A fluid dynamic bearing in accordance with claim 1, wherein said ionic liquid is an ordinary-temperature molten salt comprising a combination of an organic acid and an organic salt.

3. A fluid dynamic bearing in accordance with claim 1, wherein said ionic liquid is an ordinary-temperature molten salt comprising a combination of an organic acid and an organic salt, represented by 1-butyl-3-methylimidazolium-hexafluorophoshate or 1-butyl-3-methylimidazolium-tetrafluoroborate.

4. A fluid dynamic bearing in accordance with claim 1, wherein said dynamic pressure generation grooves formed on the opposed faces of said shaft and said sleeve unit are radial dynamic pressure grooves for generating the dynamic pressure of said lubricant for holding said shaft in the radial direction and thrust dynamic pressure grooves for generating the dynamic pressure of said lubricant for holding said shaft in the thrust direction.

5. A magnetic disk apparatus comprising:
   a fluid dynamic bearing in accordance with claim 1,
   a hub to which magnetic recording media are secured, and a motor, comprising a stator coil and a rotor magnet, for rotating said shaft or said sleeve unit.

6. A fluid dynamic bearing comprising:
a shaft;
a sleeve unit having a hole into which said shaft is inserted;
dynamic pressure generation grooves formed on one of the opposed faces of said shaft and said sleeve unit; and
a lubricant filled in the clearance between the opposed faces of said shaft and said sleeve unit, to which linear alkyl sulfonate is added as an electrical conductivity imparting agent.

7. A fluid dynamic bearing comprising:
a shaft;
a sleeve unit having a hole into which said shaft is inserted;
dynamic pressure generation grooves formed on one of the opposed faces of said shaft and said sleeve unit; and
a lubricant filled in the clearance between the opposed faces of said shaft and said sleeve unit, to which a mixture of an ionic polyvalent metal salt and a metal salt having a cation different from that of said ionic polyvalent metal salt is added as an electrical conductivity imparting agent.

8. A fluid dynamic bearing in accordance with claim 7, wherein a combination of chromium triisopropyl salicylate and calcium di-2-ethylhexyl succinate, a combination of aluminum diisopropyl salicylate and magnesium oleate or a combination of copper palmitate and calcium diisopropyl salicylate is used as an electrical conductivity imparting agent.

9. A fluid dynamic bearing comprising:
a shaft;
a sleeve unit having a hole into which said shaft is inserted;
dynamic pressure generation grooves formed on one of the opposed faces of said shaft and said sleeve unit; and
a lubricant filled in the clearance between the opposed faces of said shaft and said sleeve unit, to which a charge transfer complex is added as an electrical conductivity imparting agent.

10. A fluid dynamic bearing in accordance with claim 5, wherein said charge transfer complex serving as an electrical conductivity imparting agent is 2.4,7-trinitrofluorenone.polyvinylcarbazole or tetrathiafulvalene (TTF).tetracyanoquinodimethane.

* * * * *

UNITED STATES PATENT AND TRADEMARK OFFICE
CERTIFICATE OF CORRECTION

| | | |
|---|---|---|
| PATENT NO. | : 7,014,366 B2 | Page 1 of 1 |
| APPLICATION NO. | : 10/727733 | |
| DATED | : March 21, 2006 | |
| INVENTOR(S) | : Hideaki Ohno | |

It is certified that error appears in the above-identified patent and that said Letters Patent is hereby corrected as shown below:

Column 14:

Line 18, "claim 5" should read -- claim 9 --;
Line 22, -- (TCNQ) -- should be inserted at the end of the line.

Signed and Sealed this

Fifth Day of December, 2006

JON W. DUDAS
*Director of the United States Patent and Trademark Office*